United States Patent [19]
Gulick et al.

[11] Patent Number: 5,692,211
[45] Date of Patent: Nov. 25, 1997

[54] COMPUTER SYSTEM AND METHOD HAVING A DEDICATED MULTIMEDIA ENGINE AND INCLUDING SEPARATE COMMAND AND DATA PATHS

[75] Inventors: Dale E. Gulick; Andy Lambrecht; Mike Webb; Larry Hewitt, all of Austin; Brian Barnes, Round Rock, all of Tex.

[73] Assignee: Advanced Micro Devices, Inc., Sunnyvale, Calif.

[21] Appl. No.: 526,531

[22] Filed: Sep. 11, 1995

[51] Int. Cl.⁶ .................................................. G06F 13/00
[52] U.S. Cl. ................................. 395/800; 395/281
[58] Field of Search .......................... 395/281, 800, 395/842

[56] References Cited

U.S. PATENT DOCUMENTS

| | | | |
|---|---|---|---|
| 4,245,344 | 1/1981 | Richter | 371/68 |
| 4,394,736 | 7/1983 | Bernstein | 395/800 |
| 4,991,169 | 2/1991 | Davis et al. | 370/77 |
| 5,129,090 | 7/1992 | Bland | 395/725 |
| 5,208,745 | 5/1993 | Quentin et al. | 364/188 |
| 5,245,322 | 9/1993 | Dinwiddie, Jr. et al. | 345/115 |
| 5,261,072 | 11/1993 | Siegel | 395/425 |
| 5,280,589 | 1/1994 | Nakamura | 395/325 |
| 5,325,423 | 6/1994 | Lewis | 379/90 |
| 5,333,299 | 7/1994 | Koval | 395/550 |
| 5,373,493 | 12/1994 | Iizuka | 369/124 |
| 5,404,522 | 4/1995 | Carmon et al. | 395/650 |
| 5,440,336 | 8/1995 | Buhro et al. | 348/13 |
| 5,440,740 | 8/1995 | Chen et al. | 395/650 |
| 5,448,735 | 9/1995 | Anderson et al. | 395/650 |
| 5,450,551 | 9/1995 | Amini et al. | 395/299 |
| 5,461,679 | 10/1995 | Normile et al. | 382/304 |
| 5,487,167 | 1/1996 | Dinallo et al. | 395/650 |
| 5,497,373 | 3/1996 | Hulen et al. | 370/79 |
| 5,508,940 | 4/1996 | Rossmere et al. | 364/514 A |
| 5,519,345 | 5/1996 | Farrell et al. | 327/108 |
| 5,519,839 | 5/1996 | Culley et al. | 395/310 |
| 5,530,661 | 6/1996 | Garbe | 364/728.01 |
| 5,530,902 | 6/1996 | McRoberts et al. | 395/848 |
| 5,535,339 | 7/1996 | Kim | 395/280 |
| 5,546,547 | 8/1996 | Bowes | 395/294 |
| 5,557,757 | 9/1996 | Gephardt et al. | 395/306 |
| 5,560,022 | 9/1996 | Dunstan | 395/750 |
| 5,564,001 | 10/1996 | Lewis | 395/154 |
| 5,574,662 | 11/1996 | Windrem et al. | 395/514 R |
| 5,579,512 | 11/1996 | Goodrum | 395/500 |
| 5,594,873 | 1/1997 | Garrett | 395/281 |

FOREIGN PATENT DOCUMENTS 0 537 932 A3  5/1992  European Pat. Off. .

OTHER PUBLICATIONS

Kettler, Kevin A. and Jay K. Strosnider, "Scheduling Analysis of the MicroChannel Architecture for Multimedia Applications," Department of Electrical and Computer Engineering, Carnegie Mellon University, Pittsburgh, PA, May 1994, pp. 403–414.

PCI Local Bus—*PCI Multimedia Design Guide*—Revision 1.0—Mar. 29, 1994, 43 pages.

*Primary Examiner*—Eric Coleman
*Attorney, Agent, or Firm*—Conley, Rose & Tayon; Jeffrey C. Hood

[57] ABSTRACT

The present invention comprises a computer system and method optimized for real-time applications which provides increased performance over current computer architectures. The system includes a dedicated multimedia engine and dedicated multimedia memory coupled directly to the main memory. The computer system includes a data path to the main memory and the multimedia memory, and includes a separate command path to the multimedia engine. In one embodiment, the CPU includes a separate command path through the chipset logic to the multimedia engine. In an alternate embodiment, the CPU includes a separate command path to the multimedia engine through the PCI bus. In this alternate embodiment, the multimedia engine includes a PCI interface which couples to the PCI bus. The multimedia engine executes commands and data from the multimedia memory to perform a number of real-time operations, including audio and video functions, as well as others. Thus the computer system of the present invention provides greater performance for real-time applications than prior systems.

34 Claims, 11 Drawing Sheets

COMPUTER SYSTEM AND METHOD HAVING A DEDICATED MULTIMEDIA ENGINE AND INCLUDING SEPARATE COMMAND AND DATA PATHS

FIELD OF THE INVENTION

The present invention relates to a computer system and method including a dedicated multimedia engine and multimedia memory and having separate command and data paths for transferring commands and data to the dedicated multimedia engine and multimedia memory.

DESCRIPTION OF THE RELATED ART

Computer architectures generally include a plurality of devices interconnected by one or more various buses. For example, modern computer systems typically include a CPU coupled through bridge logic to main memory. The bridge logic also typically couples to a high bandwidth local expansion bus, such as the peripheral component interconnect (PCI) bus or the VESA (Video Electronics Standards Association) VL bus. Examples of devices which can be coupled to local expansion buses include video accelerator cards, audio cards, telephony cards, SCSI adapters, network interface cards, etc. An older type expansion bus is generally coupled to the local expansion bus. Examples of such expansion buses included the industry standard architecture (ISA) bus, also referred to as the AT bus, the extended industry standard architecture (EISA) bus, or the microchannel architecture (MCA) bus. Various devices may be coupled to this second expansion bus, including a fax/modem, sound card, etc.

Personal computer systems were originally developed for business applications such as word processing and spreadsheets, among others. However, computer systems are currently being used to handle a number of real time applications, including multimedia applications having video and audio components, video capture and playback, telephony applications, and speech recognition and synthesis, among others. These real time applications typically require a large amount of system resources and bandwidth.

One problem that has arisen is that computer systems originally designed for business applications are not well suited for the real-time requirements of modern multimedia applications. For example, modern personal computer system architectures still presume that the majority of applications executing on the computer system are non real-time business applications such as word processing and/or spreadsheet applications, which execute primarily on the main CPU. In general, computer systems have not traditionally been designed with multimedia hardware as part of the system, and thus the system is not optimized for multimedia applications. Rather, multimedia hardware is typically designed as an add-in card for optional insertion in an expansion bus of the computer system.

In many cases, multimedia hardware cards situated on an expansion bus do not have the required access to system memory and other system resources for proper operation. For example, a multimedia hardware card situated on the PCI expansion bus must first arbitrate for control of the PCI bus before the device can access system memory. In addition, since the computer system architecture is not optimized for multimedia, multimedia hardware cards generally do not make efficient use of system resources. As an example, multimedia hardware cards typically include their own memory in addition to system memory. For example, video accelerator cards are typically configured with one to four Megabytes of video RAM. Audio cards, video capture cards, and other multimedia cards are also generally configured with dedicated on-board memory. This requirement of additional memory adds undesirable cost to the system.

As multimedia applications become more prevalent, multimedia hardware will correspondingly become essential components in personal computer systems. Therefore, an improved computer system architecture is desired which is optimized for real-time multimedia applications as well as for non-realtime applications. In addition, improved methods are desired for transferring real-time data to multimedia hardware.

SUMMARY OF THE INVENTION

The present invention comprises a computer system and method optimized for real-time applications which provides increased performance over current computer architectures. The system includes a dedicated multimedia engine and dedicated multimedia memory coupled directly to the main memory. The computer system includes a data path to the main memory and the multimedia memory, and includes a separate command path to the multimedia engine. The multimedia engine executes commands and data from the multimedia memory to perform a number of real-time operations, including audio and video functions, as well as others. Thus the computer system of the present invention provides greater performance for real-time applications than prior systems.

The computer system includes a CPU coupled to chip set or bridge logic to a memory bus, and main memory is coupled to the memory bus. The bridge logic also couples to a local expansion bus such as the PCI bus. Various devices may be connected to the PCI bus, including a hard drive, network interface card, etc. The bridge logic and main memory are also coupled through the memory bus or a separate local bus to a dedicated multimedia engine as well as dedicated multimedia memory. The multimedia memory may reside either in the multimedia engine or external to the engine. A direct memory access (DMA) engine is preferably coupled to the multimedia memory, and in one embodiment is comprised in the multimedia engine.

The computer system also includes a separate command path to the multimedia engine. In one embodiment, the CPU includes a separate command path through the chipset logic to the multimedia engine. In an alternate embodiment, the CPU includes a separate command path to the multimedia engine through the PCI bus. In this alternate embodiment, the multimedia engine includes a PCI interface which couples to the PCI bus. Where the multimedia memory is separate from the multimedia engine, the separate command path may be to a DMA engine coupled to the multimedia memory.

The multimedia engine includes one or more DSP engines which comprise either one or more general purpose DSP engines or dedicated audio and video engines. The one or more DSP engines couple through one or more I/O channels to respective I/O ports, including video, audio and communication ports. The multimedia engine includes video ports for coupling to a video monitor, audio ports for coupling to an audio DAC or speakers, and one or more communication ports.

According to the present invention, the CPU writes video and/or audio instructions and data to the main memory. The CPU also preferably writes transfer information on the separate command path to the multimedia engine, preferably to command buffers comprised in the multimedia engine. The transfer information includes the main memory address where the commands and data reside, the number of bytes of data, and other transfer information. In one embodiment, the CPU writes transfer commands as well as multimedia data instructions through the separate command path to the buffer in the multimedia engine.

The multimedia engine uses the transfer commands to retrieve the multimedia data into the multimedia memory. In one embodiment, a DMA engine comprised in the multimedia engine uses this information to retrieve the commands and data from main memory into the multimedia memory. The DMA engine preferably operates concurrently with the multimedia engine, thus allowing for improved performance. The multimedia engine then executes the multimedia instructions from the buffer to process the multimedia data. In this embodiment, the CPU feeds multimedia instructions to the multimedia engine concurrently with the transfer of multimedia data from the main memory to the multimedia engine.

Therefore, the present invention comprises a novel computer system architecture and method which increases the performance of real-time applications. A dedicated multimedia engine and multimedia memory are coupled directly to the main memory. The CPU transfers multimedia data and instructions to the main memory and provides transfer information and/or multimedia commands over a separate command path to the multimedia engine or a dedicated DMA engine. The inclusion of separate data and command paths allows for more efficient computer operations. The CPU is no longer required to perform separate transfers over the memory bus to different devices, i.e., separate transfers of multimedia data and transfer commands to the main memory and the multimedia engine, respectively. Rather, the CPU performs a data transfer over the memory bus to main memory and a command transfer directly to the multimedia engine. This allows for more efficient transfers of multimedia data and commands within a computer system.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

*PCI System Architecture* by Tom Shanley and Don Anderson and available from Mindshare Press, 2202 Buttercup Dr., Richardson, Tex. 75082 (214) 231-2216, is hereby incorporated by reference in its entirety.

The Intel Peripherals Handbook, 1994 and 1995 editions, available from Intel Corporation, are hereby incorporated by reference in their entirety. Also, data sheets on the Intel 82430FX PCIset chipset, also referred to as the Triton chipset, are hereby incorporated by reference in their entirety, including the 82430 Cache Memory Subsystem data sheet (Order No. 290482-004), the 82420/82430 PCIset ISA and EISA bridge data sheet (Order No. 290483-004), and the Intel 82430FX PCIset Product Brief (Order No. 297559-001), all of which are available from Intel Corporation, Literature Sales, P.O. Box 7641, Mt. Prospect, Ill. 60056-7641 (1-800-879-4683), and all of which are hereby incorporated by reference in their entirety.

U.S. patent application Ser. No. 08/481,705 titled "Computer System Having a Dedicated Multimedia Engine Including Multimedia Memory" and filed Jun. 7, 1995, whose inventors are Dale Gulick, Andy Lembrecht, Mike Webb, Larry Hewitt and Brian Barnes, and which is assigned to the same assignee as the present invention, is hereby incorporated by reference in its entirety.

U.S. patent application Ser. No. 08/474,554 titled "Computer System Having a Dedicated Multimedia Engine and Multimedia Memory" and filed Jun. 7, 1995, whose inventors are Dale Gulick, Andy Lembrecht, Mike Webb, Larry Hewitt and Brian Barnes, and which is assigned to the same assignee as the present invention, is hereby incorporated by reference in its entirety.

U.S. patent application Ser. No. 08/479,870 titled "Computer System and Method for Transferring Commands and Data to a Dedicated Multimedia Engine" and filed Jun. 7, 1995, whose inventors are Dale Gulick, Andy Lembrecht, Mike Webb, Larry Hewitt and Brian Barnes, and which is assigned to the same assignee as the present invention, is hereby incorporated by reference in its entirety.

Computer System Block Diagram

Figure 1:
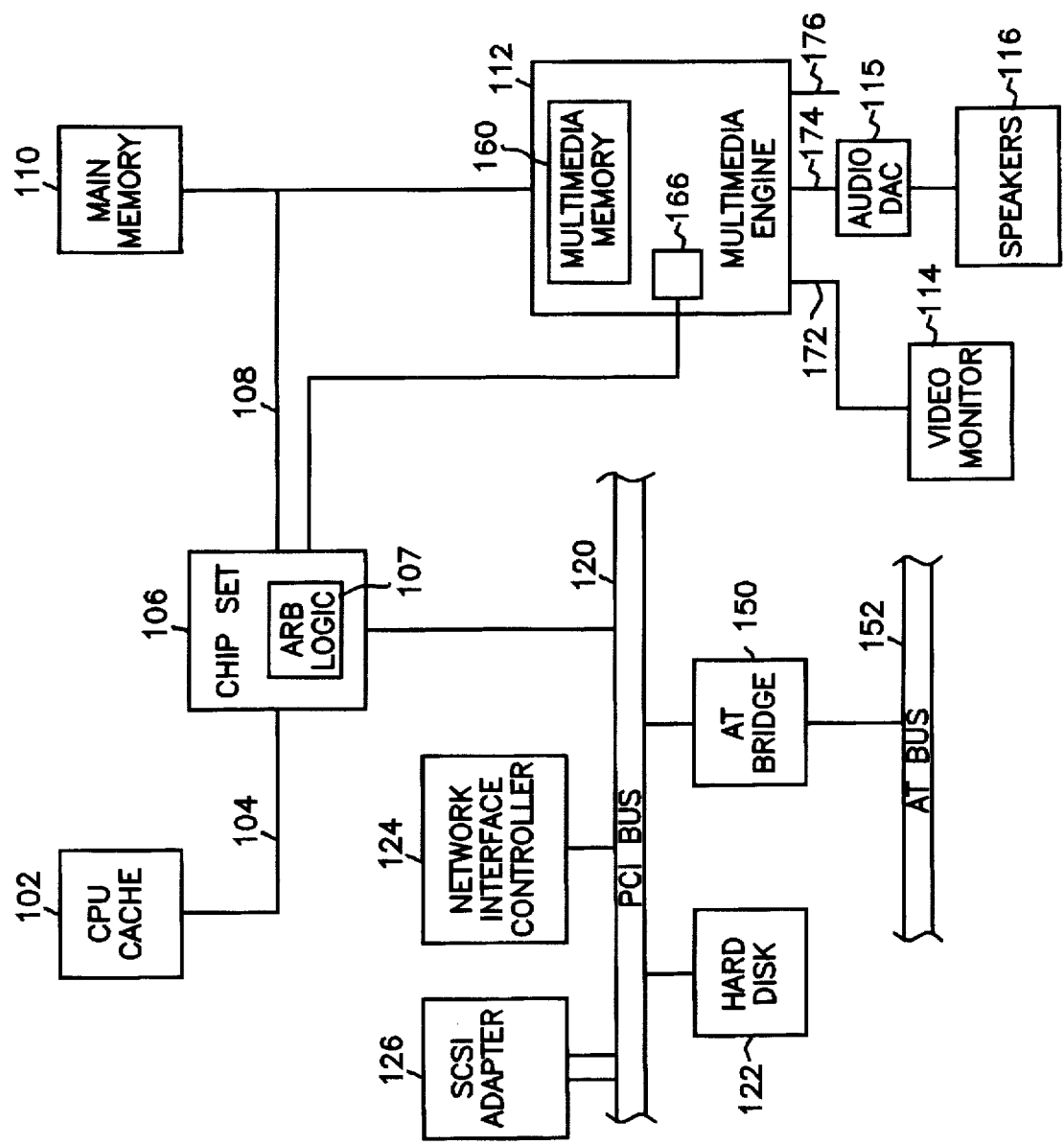
FIG. 1 is a block diagram of a computer system including a separate command path to a multimedia engine according to the present invention.

Referring now to FIG. 1, a block diagram of a computer system according to the present invention is shown. As shown, the computer system includes a central processing unit (CPU) 102 which is coupled through a CPU local bus 104 to a host/PCI/cache bridge or chipset 106. The chipset 106 includes arbitration logic 107 as shown. The chipset 106 is preferably similar to the Triton chipset available from Intel Corporation, including certain arbiter modifications to accommodate the multimedia engine of the present invention. A second level or L2 cache memory (not shown) may be coupled to a cache controller in the chipset, as desired. The bridge or chipset 106 couples through a memory bus 108 to main memory 110. The main memory 110 is preferably DRAM (dynamic random access memory) or EDO (extended data out) memory, or other types of memory, as desired.

The host/PCI/cache bridge 106 and the main memory 110 also couple through the memory bus 108 to the multimedia engine 112 according to the present invention. The multimedia engine 112 performs video and audio processing functions. As shown, the multimedia engine 112 preferably includes a video port 172 for coupling to a video monitor 114 and an audio port 174 which couples through an audio digital to analog converter (audio DAC) 115 to speakers 116. The audio DAC 115 includes a D/A converter, such as those available from Crystal Semiconductor of Austin, Tex. The multimedia engine 112 may also include a communications port. In the embodiment shown in FIG. 1, the multimedia engine 112 also includes multimedia memory 160. In the embodiments shown in FIGS. 4, 5, 7, and 8, the multimedia memory 160 is separate from the multimedia engine 112. The multimedia engine 112 also includes command buffers 166 as shown.

Figure 9:
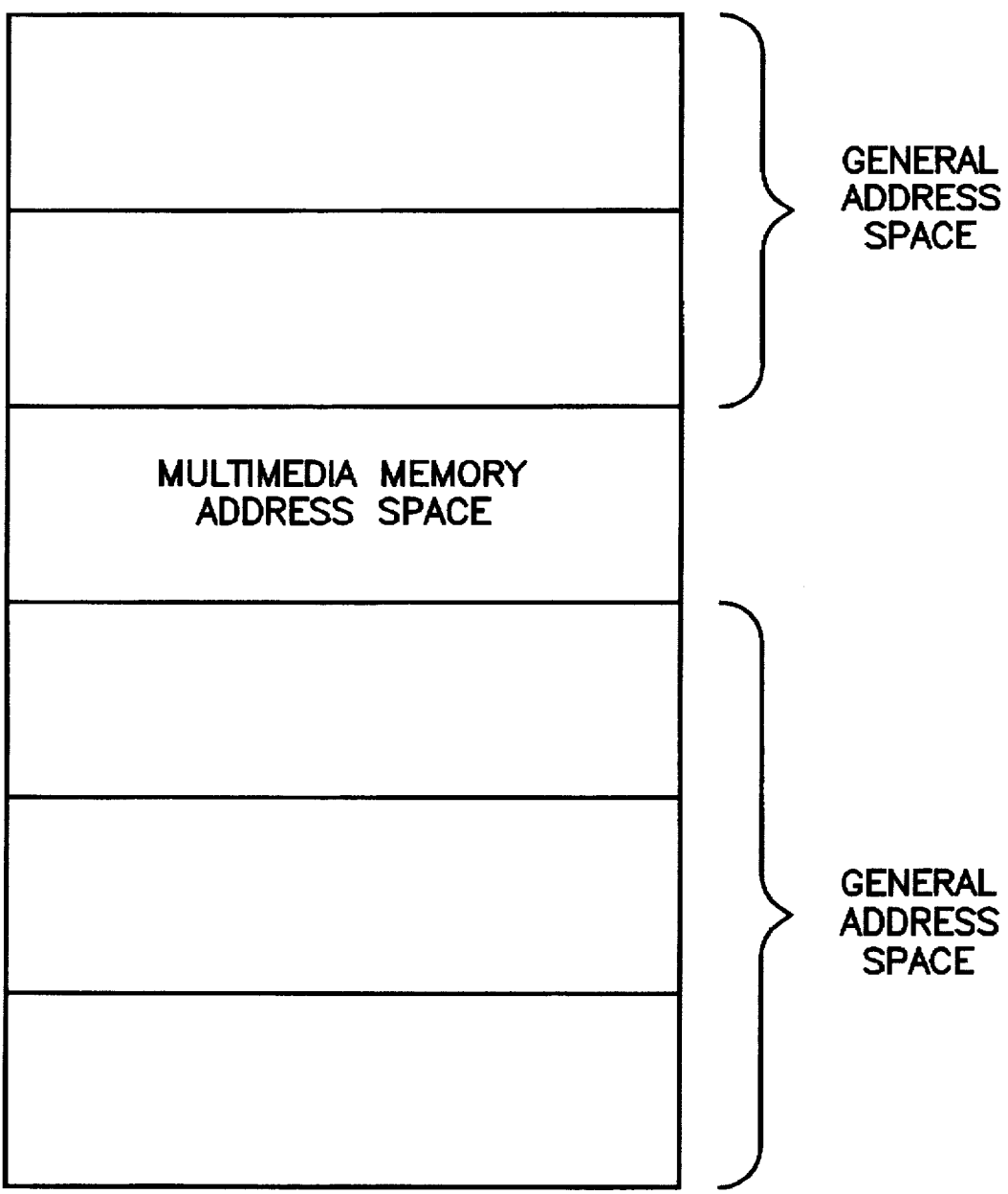
FIG. 9 illustrates the main memory address space of the main memory and the multimedia memory comprised in the multimedia engine.

In the various embodiments of the present invention, the multimedia memory 160 is mapped to the main memory address space and thus comprises a portion of the main memory address space, as shown in FIG. 9. Thus the multimedia memory 160 is available to store non-multimedia data as needed. In other words, if the main memory 110 becomes full and additional memory is needed, the CPU 102 can store code and data in the multimedia memory 160. Thus, the multimedia memory 160 is used for real-time or multimedia data and is also used by the CPU 102 as overflow memory space.

The host/PCI/cache bridge or chipset 106 also interfaces to a peripheral expansion bus, preferably a peripheral component interconnect (PCI) bus 120. In the preferred embodiment, a PCI local bus is used. However, it is noted that other local buses may be used, such as the VESA (Video Electronics Standards Association) VL bus. Various types of devices may be connected to the PCI bus 120. In the embodiment shown in FIG. 1, a hard disk 122 and a network interface controller 124 are coupled to the PCI bus 120. A SCSI (small computer systems interface) adapter 126 may also be coupled to the PCI bus 120, as shown. The SCSI adapter 126 may couple to various SCSI devices, such as a CD-ROM drive and a tape drive (both not shown), as desired. Various other devices may be connected to the PCI bus 120, as is well known in the art.

Expansion bus bridge logic 150 may also be coupled to the PCI bus 120. The expansion bus bridge logic 150 interfaces to an expansion bus 152. The expansion bus 152 may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, such as expansion bus memory or a modem (both not shown). The expansion bus bridge logic 150 may also connect to various peripherals, including an interrupt system, a real time clock (RTC) and timers, a direct memory access (DMA) system, and ROM/Flash memory (all not shown). Alternatively, the above logic is comprised in the chipset 106. In an alternate embodiment, the computer system does not include expansion bus 150, as desired.

Figure 2:
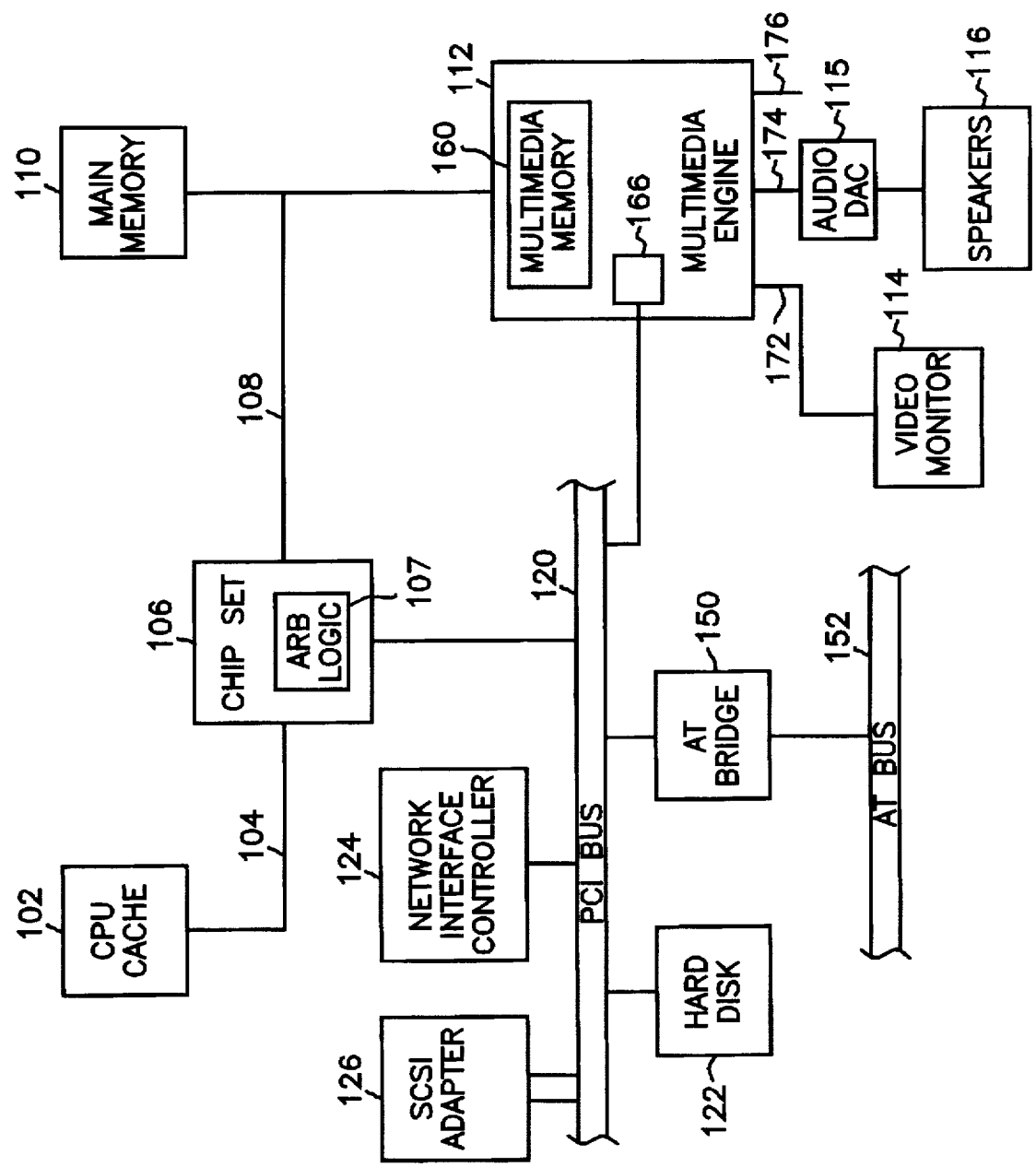
FIG. 2 is a block diagram of a computer system including a separate command path through a PCI local bus to the multimedia engine according to an alternate embodiment of the present invention.

Referring now to FIG. 2, an alternate embodiment of the computer system of FIG. 1 is shown. In the embodiment of FIG. 2, the multimedia engine 112 is coupled to the PCI bus 120 as well as to the memory bus 108, and the chip set 106 provides commands through the PCI bus 120 to the multimedia engine 112. More specifically, the chipset 106 provides commands through the PCI bus to the command buffers 166 in the multimedia engine 112. Thus, in this embodiment, the CPU 102 provides data through the memory bus 108 to the main memory 110 and provides commands through the PCI bus 120 to the multimedia engine 112.

Arbitration Logic

The chipset 106 preferably includes the arbitration logic 107 which determines access to the main memory 110. The arbitration logic 107 is coupled to the CPU 102, the main memory 110 and the multimedia engine 112. The arbitration logic 107 receives bus requests from each of the CPU 102 and the multimedia engine 112 and grants main memory access to either of the CPU 102 or the multimedia engine 112. In the preferred embodiment, the CPU 102 has priority access to the main memory 110. Alternatively, the memory bus 108 is an isochronous bus where each of the CPU 102 and the multimedia engine 112 have guaranteed bandwidth and latency on the bus 108 to the main memory 110. Alternative arbitration schemes such as a round robin or priority based scheme may be used as desired.

As mentioned above, the main memory 110 and the multimedia memory 160 preferably share a common address space. FIG. 9 illustrates the main memory address space, wherein the multimedia memory 160 comprises part of the main memory address space. Thus the multimedia memory 160 is available to store non-multimedia data as needed. In this embodiment, the multimedia engine 112 and CPU 102 must also arbitrate for access to the multimedia memory 160. The multimedia engine 112 preferably has priority access to the multimedia memory 160. In one embodiment, the multimedia engine 112 simply writes one or more bits to a register in the arbitration logic 107 to gain control of the multimedia memory 160, and the CPU 102 is only granted access to the multimedia memory 160 after a certain starvation period.

Figure 3:
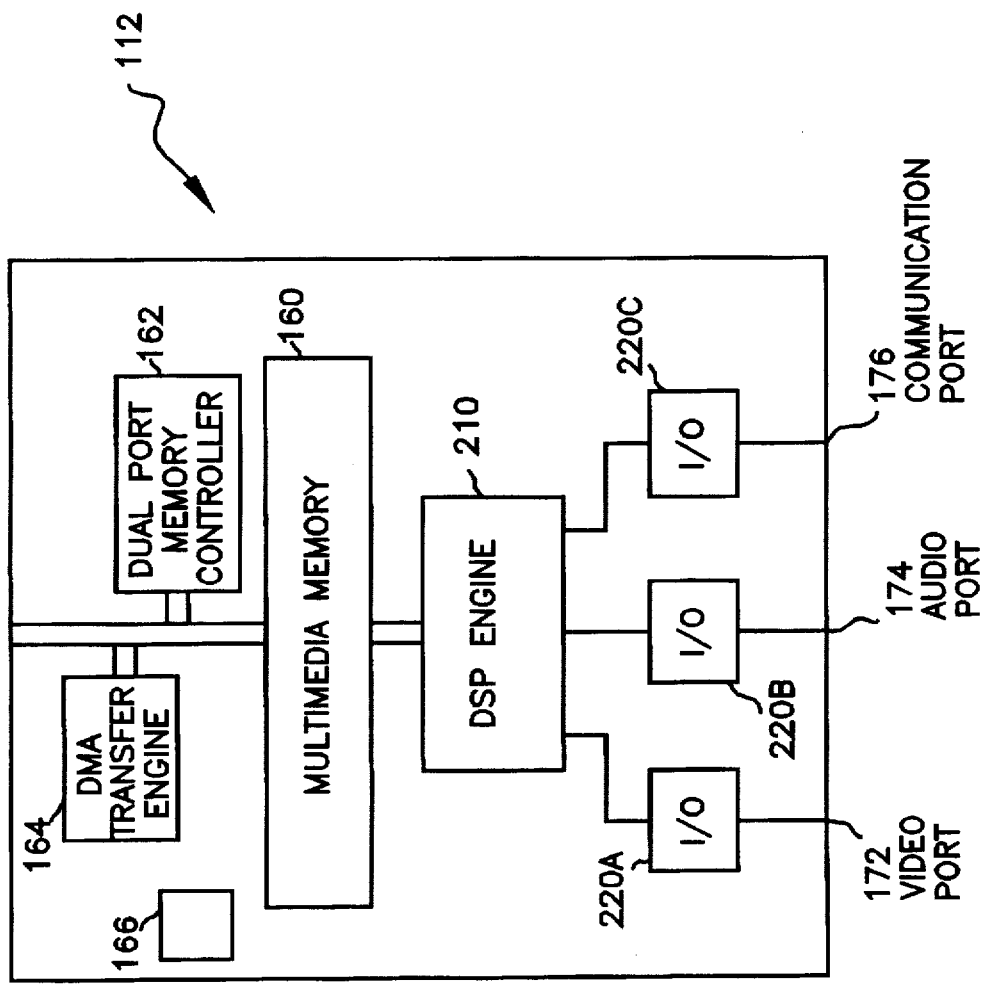
FIG. 3 is a block diagram of the multimedia engine of FIGS. 1 and 2.

Multimedia Engine Block Diagram—FIG. 3

Referring now to FIG. 3, a more detailed block diagram illustrating the multimedia engine 112 is shown. In the embodiment shown in FIG. 3, the multimedia engine 112 includes multimedia memory 160. In the embodiment shown in FIG. 6, the multimedia engine 112 does not include the multimedia memory 160, but rather the multimedia memory 160 is separate from the multimedia engine 112.

In the embodiment of FIG. 3, the multimedia memory 160 is dual ported memory. In this embodiment, a first port of the memory 160 couples through the local bus 108 to the main memory 110. The second port of the multimedia memory 160 couples to one or more DSP engines 210. The multimedia memory 160 preferably comprises high speed dual ported VRAM (video random access memory), or dual ported DRAM (dynamic random access memory). The multimedia memory 160 may also comprise SRAM (static random access memory) or EDO (extended data out) DRAM. The multimedia engine 112 preferably includes a dual port DRAM memory controller 162 for controlling the dual port memory functions of the multimedia memory 160. For more information on the operation of a dual port memory controller, please see the Intel 8207 Dual-Port Dynamic RAM Controller Data Sheet (Order No. 210463-007), available from Intel Corporation, which is hereby incorporated by reference.

In the embodiment shown in FIG. 3, the multimedia engine 112 also includes a DMA transfer engine 164 which performs data transfers from the main memory 110 to the multimedia memory 160. The DMA transfer engine 164 preferably transfers data from the main memory 110 to the multimedia memory 160 contemporaneously with operations performed by the one or more DSP engines 210. In one embodiment, the multimedia memory 160 is partitioned into two or more separate address spaces or buffers, and the DMA engine 164 transfers data from main memory 110 to a first address space or buffer in the multimedia memory 160 while the DSP engine 210 accesses commands and data from the other address space or buffer.

The multimedia engine 112 also preferably includes command buffers 166 which store commands received from the CPU 102. These commands comprise transfer commands for use by the DMA engine 164 in transferring data from the main memory 110 to the multimedia memory 160. The command buffers 166 preferably includes one or more first in first out (FIFO) buffers for storing transfer commands. The command buffers 166 may also include prioritization logic for prioritizing commands received from the CPU 102. The command buffers 166 may also receive multimedia instructions from the CPU 102 which are executed by the DSP engine 210 on multimedia data.

In the preferred embodiment shown in FIG. 3, the multimedia engine 112 includes one DSP engine 210 which preferably performs video and audio processing functions. In the preferred embodiment, the DSP engine 210 is a general purpose DSP engine that performs both video and audio processing functions as well as other real-time functions. In one embodiment, the DSP engine 210 includes one or more ROMs (not shown) which store microcode corresponding to video and audio processing instructions or commands. The DSP engine 210 preferably performs video and graphics functions such as polygon rendering and texture mapping, among others. The DSP engine 210 preferably performs audio functions such as MIDI and wavetable synthesis, among others. The DSP engine 210 may also perform communication functions, such as ISDN connectivity or modem functionality, as desired.

Alternate embodiments of the multimedia engine 112 include two or more DSP engines. One embodiment includes three separate hardware engines (not shown), including a video or graphics accelerator engine, an audio engine, and a communications or modem engine.

The one or more DSP engines 210 couple to one or more I/O channels 220. In the preferred embodiment shown in FIG. 3, the multimedia engine 112 includes three I/O channels 220A, 220B, and 220C. I/O channel 220A is preferably a dedicated video channel and couples to video port outputs 172 of the multimedia engine 112. I/O channel 220B is preferably a dedicated audio channel and couples to audio port 174 of the multimedia engine 112. I/O channel 220C couples to communication port 176 of the multimedia engine 112. In one embodiment, the video and audio I/O channels 220A and 220B are synchronized with each other to ensure synchronized audio and video during multimedia presentations.

In the preferred embodiment, the multimedia engine 112 includes video processing circuitry and/or firmware, including a random access memory digital to analog converter (RAMDAC), for converting video data into appropriate analog signals, preferably red, green and blue (RGB) signals, for output directly to video monitor 114. In an alternate embodiment, the DSP engine 210 provides digital video pixel data through I/O channel 220A to the video port 172, and a separate RAMDAC and associated logic circuitry (not shown) receives the video pixel data from the video port 172 and generates the appropriate RGB signals to drive the display monitor 114.

In the preferred embodiment, the DSP engine 210 generates digital audio data that is provided through the I/O channel 220B to the audio port 174. A separate audio digital to analog converter (audio DAC) (115 FIG. 1) is preferably connected to the audio port 174 and converts the digital audio data to the appropriate analog signals to drive one or more speakers 116. Alternatively, the audio DAC functions are included within the multimedia engine 112.

Figure 4:
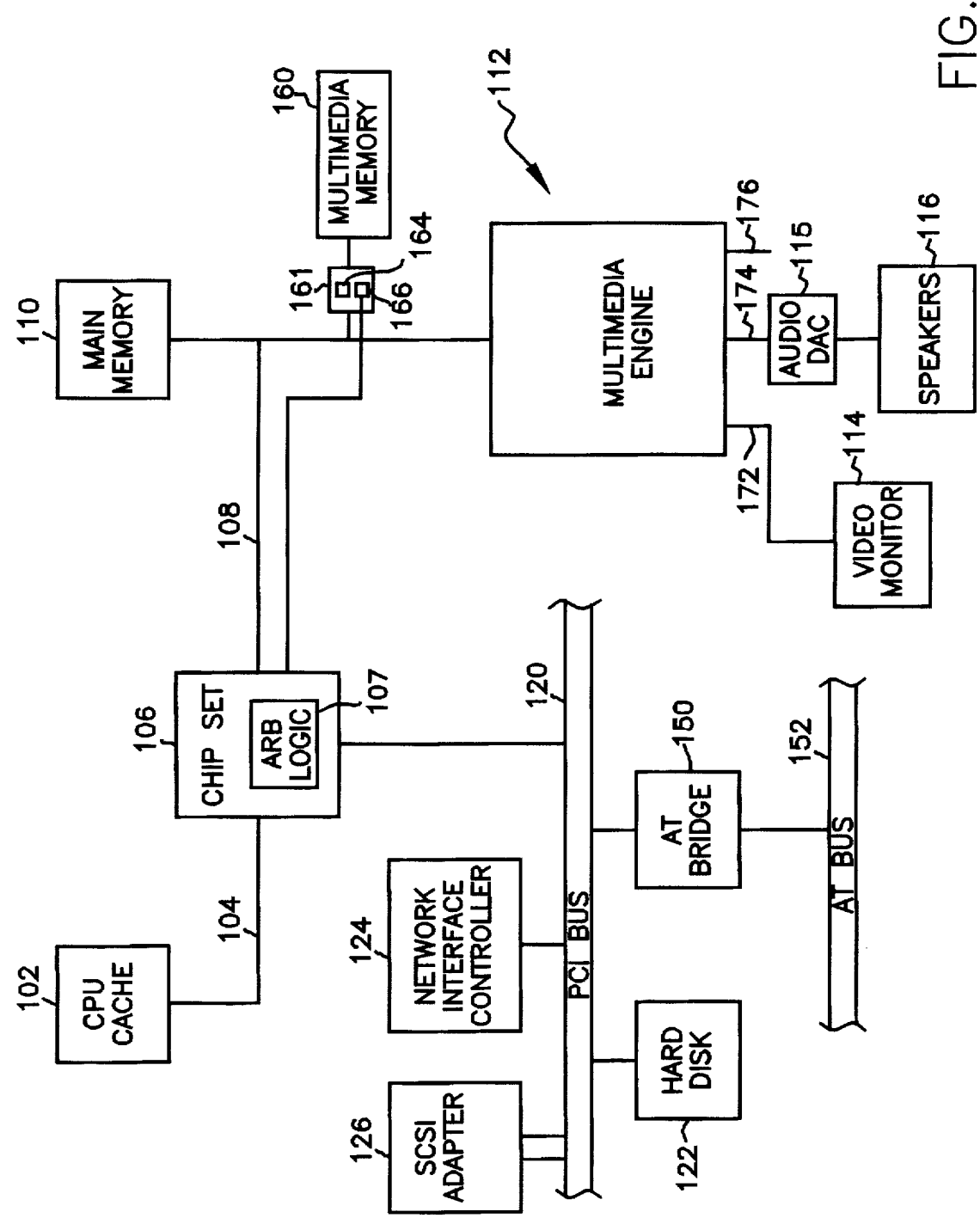
FIG. 4 is a block diagram of a computer system including a multimedia engine and separate multimedia memory and including separate command and data paths according to an alternate embodiment of the present invention.
Figure 5:
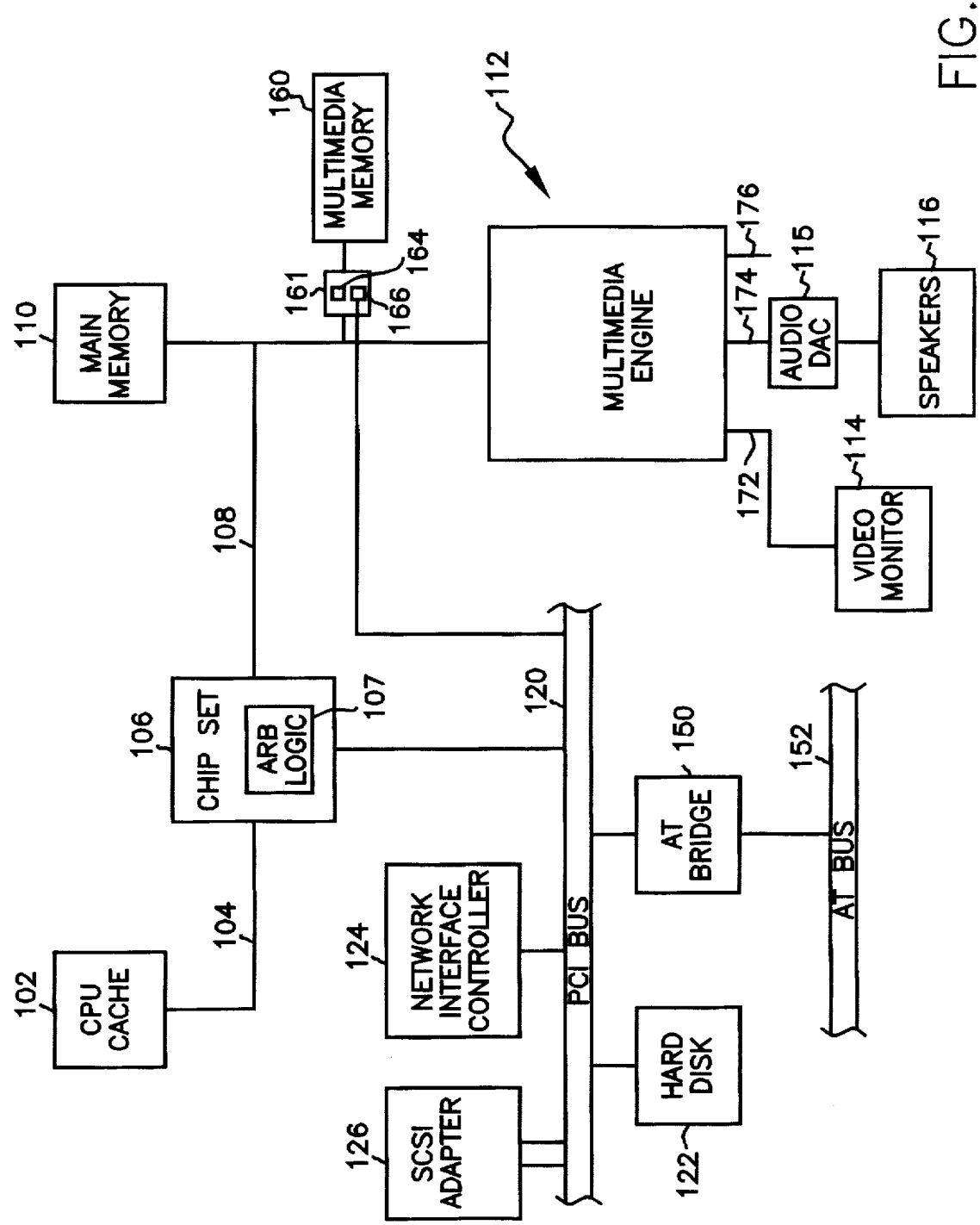
FIG. 5 is a block diagram of a computer system having a separate multimedia memory and including a separate command path through a PCI local bus to the multimedia memory according to an alternate embodiment of the present invention.

Alternate Embodiments—FIGS. 4 and 5

Referring now to FIG. 4, an alternate embodiment of the computer system is shown. In the embodiment of FIG. 4, the multimedia memory 160 is not comprised in the multimedia engine 112. Rather, the multimedia memory 160 is coupled through arbiter block 161 to the local bus or memory bus 108. The arbiter logic 161 preferably includes a DMA (direct memory access) engine 164 which performs transfers between the main memory 110 and the multimedia memory 160. The arbiter block 161 performs arbitration between the direct memory access engine 164, the multimedia engine 112 and the CPU 102 for the multimedia memory 160.

In the embodiment of FIG. 4, the computer system includes a separate command path from the chipset 106 to the arbiter block 161. The arbiter block 161 preferably includes one or more command buffers 166 for storing commands received from the CPU 102. As described above, commands received from the CPU 102 preferably comprise transfer commands for use by the DMA engine 164 in transferring data from the main memory 110 to the multimedia memory 160. The one or more command buffers 166 preferably includes one or more first in first out (FIFO) buffers for storing transfer commands. The command buffers 166 may also include prioritization logic for prioritizing commands received from the CPU 102. The command buffers 166 may also receive multimedia instructions from the CPU 102 which are executed by the DSP engine 210 on multimedia data.

Referring now to FIG. 5, an alternate embodiment of the computer system of FIG. 4 is shown. In the embodiment of FIG. 5, the arbiter block 161 is coupled to the PCI bus 120 as well as to the memory bus 108, and the chip set 106 provides commands through the PCI bus 120 to the arbiter block 161. More specifically, the chipset 106 provides commands through the PCI bus to the command buffers 166 in the arbiter block 161. Thus, in this embodiment, the CPU 102 provides data through the memory bus 108 to the main memory 110 and provides commands through the PCI bus 120 to the arbiter block 161.

Figure 6:
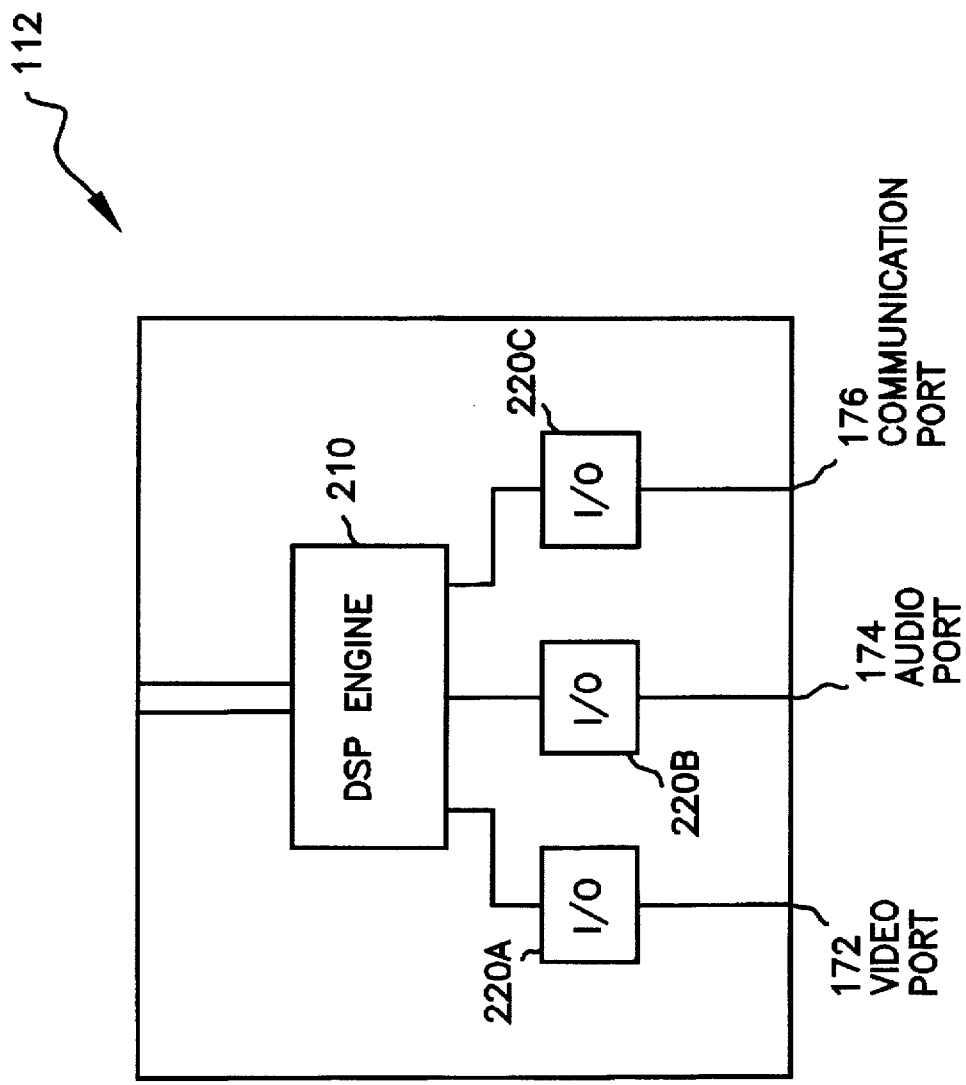
FIG. 6 is a block diagram of the multimedia engine of FIGS. 4 and 5.

Multimedia Engine Block Diagram—FIG. 6

Referring now to FIG. 6, a more detailed block diagram illustrating the multimedia engine 112 is shown. In the embodiment shown in FIG. 6, the multimedia engine 112 does not include the multimedia memory 160, but rather the multimedia memory 160 is separate from the multimedia engine 112. The multimedia memory 160 preferably comprises high speed VRAM (video random access memory), or DRAM (dynamic random access memory).

As described above with reference to FIG. 3, the multimedia engine 112 preferably includes one general-purpose DSP engine 210 which preferably performs video and audio processing functions or may include two or more DSP engines, as desired. The multimedia engine 112 may include various processing circuitry or firmware, as described above with reference to FIG. 3.

The one or more DSP engines 210 couple to one or more I/O channels 220. In the embodiment shown in FIG. 6, the multimedia engine 112 includes three I/O channels 220A, 220B, and 220C. I/O channel 220A is preferably a dedicated video channel and couples to video port outputs 172 of the multimedia engine 112. I/O channel 220B is preferably a dedicated audio channel and couples to audio port 174 of the multimedia engine 112. I/O channel 220C couples to communication port 176 of the multimedia engine 112. In one embodiment, the video and audio I/O channels 220A and 220B are synchronized with each other to ensure synchronized audio and video during multimedia presentations.

As shown, in the embodiment of FIG. 6, the multimedia engine 112 does not include a DMA transfer engine 164. Rather, the DMA engine 164 is comprised in the arbiter block 161. In an alternate embodiment, the DMA engine 164 is comprised in the multimedia engine 112 of FIG. 6 and performs data transfers from the main memory 110 to the multimedia memory 160.

Figure 7:
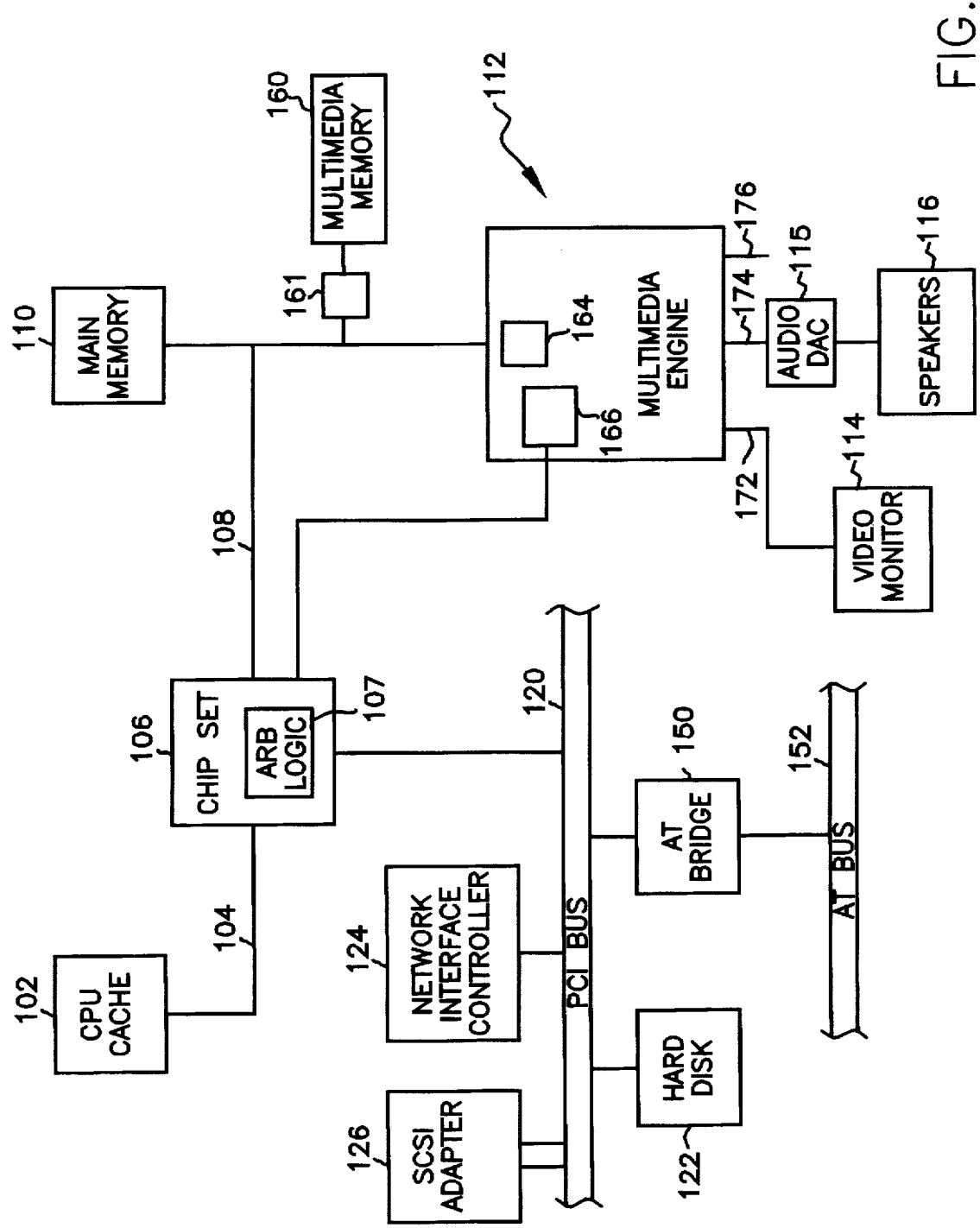
FIG. 7 is a block diagram of a computer system including a multimedia engine and separate multimedia memory and including separate command and data paths according to a third embodiment of the present invention.
Figure 8:
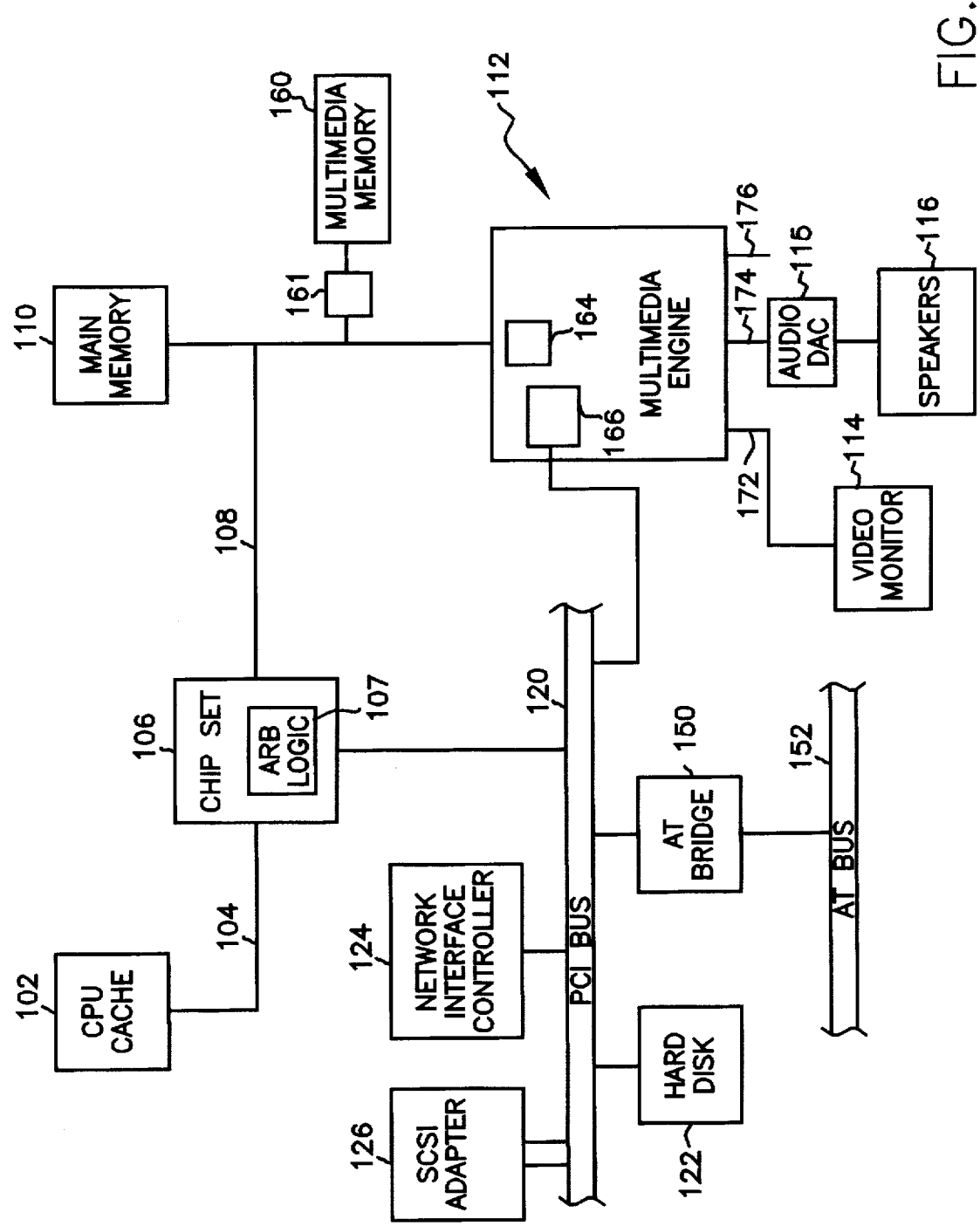
FIG. 8 is a block diagram of a computer system including a multimedia engine and a separate multimedia memory and including a separate command path through a PCI local bus to the multimedia engine according to a third embodiment of the present invention.

Alternate Embodiment—FIGS. 7 and 8

Referring now to FIGS. 7 and 8, alternate embodiments of the computer system are shown. The embodiments of FIGS. 7 and 8 are similar to the embodiments of FIGS. 4 and 5, wherein the multimedia memory 160 is coupled through arbiter block 161 to the local bus 108. However, in the embodiments of FIGS. 7 and 8, the command buffers 166 are comprised in the multimedia engine 112.

In these embodiments, the DMA transfer engine 164 is preferably comprised in the multimedia engine 112. Thus the CPU 102 transfers multimedia data to the main memory 110 over the memory bus 108, and transfers data transfer commands and optionally multimedia instructions to the command buffers 166 using the separate command path. The command buffers 166 receive the data transfer commands and prioritizes these commands, as desired. The DMA transfer engine 164 executes the data transfer commands to retrieve multimedia data and instructions from the main memory 110 to the multimedia memory 160.

In one embodiment, the CPU 102 transfers multimedia data directly to the multimedia memory 160 instead of to the main memory 110. In this embodiment, the DMA engine 164 is not necessary. Rather, the CPU 102 transfers the multimedia data directly to the multimedia memory 160, and transfers multimedia data location information and/or instructions directly to the command buffers 166. The multimedia engine 112 retrieves the multimedia data and instructions directly from the multimedia memory 160. In this embodiment, the DMA engine 164 is not required to perform transfers from the main memory 110 to the multimedia memory 160.

Computer System Operation Flowchart

Figure 10:
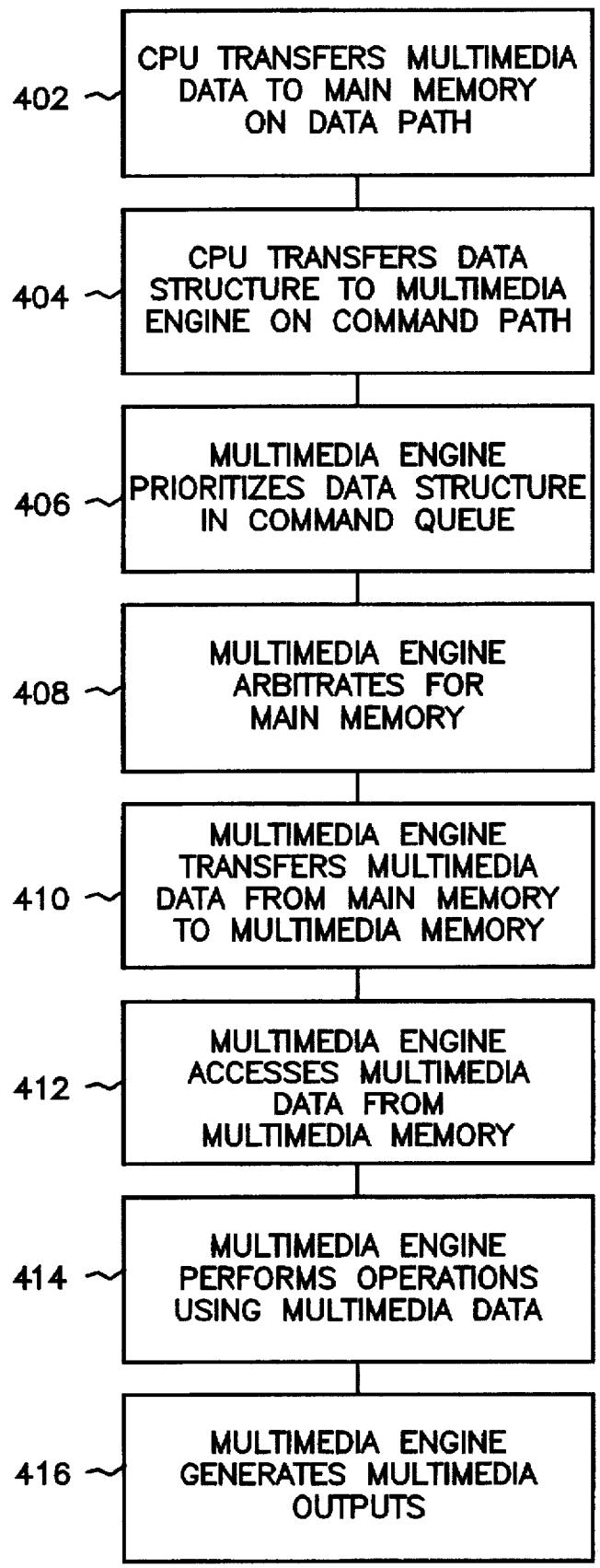
FIG. 10 is a flowchart diagram illustrating operation of the computer system of the present invention.

FIG. 10 is a flowchart diagram illustrating operation of the present invention for the embodiments of FIGS. 1 and 2. In the preferred embodiment, the main memory 110 stores the operating system and applications software as well as driver software, including video drivers and audio drivers. The CPU 102 executes applications software and driver software from the main memory 110 and generates real-time or multimedia data. In the present disclosure, the term "multimedia data" refers to video or graphical dam, audio data, telephony data, and other types of real-time or communication data. The term multimedia data may also include instructions which indicate desired operations on the above data.

When an application executing on the CPU 102 generates multimedia data, the CPU 102 writes the multimedia data to the main memory 110 in step 402. The multimedia data includes data and may include one or more commands or instructions that perform operations on the data. The CPU 102 then provides a transfer data structure comprising one or more data transfer commands directly to the multimedia engine 112 in step 404 over the separate command path. The transfer data structure is provided to the command buffers 166, or alternatively may be provided to the multimedia memory 160 in the multimedia engine 112. The data structure comprises location information regarding the multimedia data and may also include high level instructions or commands regarding the nature or purpose of the data or the operations desired to be executed on the data.

In step 406 the multimedia engine 112 optionally prioritizes the transfer data structure with other real-time data structures that have already been received. Thus the multimedia engine 112 intelligently prioritizes received multimedia data structures based on a desired priority scheme and the available resources. Thus, the video and audio components of a multimedia presentation may receive a higher priority than a telephony application that can be performed in the background. In an alternate embodiment, the multimedia engine 112 does not prioritize received data structures or commands, but rather merely acts as a slave and executes received data structures in the order they are received.

Figure 11:
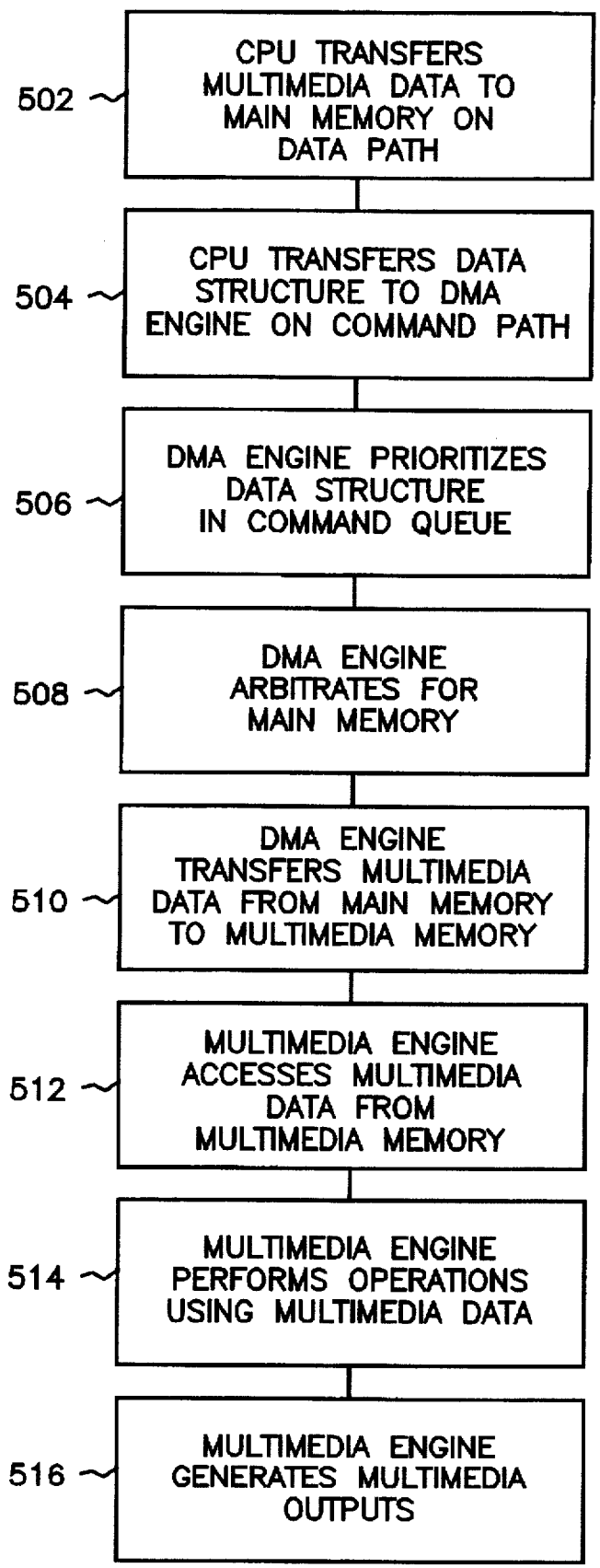
FIG. 11 is a flowchart diagram illustrating operation of the computer system of the present invention according to an alternate embodiment.

In step 408 the multimedia engine 112 arbitrates for access to the main memory 110. This involves asserting a bus request signal to the arbitration logic 107 in the chipset 106. The multimedia engine 112 may also provide priority data, preferably one or more priority bytes, to the arbitration logic 107 which is used by the arbitration logic 107 in determining the arbitration. Once the multimedia engine achieves access to main memory 110, the multimedia engine 210 uses the data structure received from the CPU 102 to transfer the multimedia data from main memory 110 and store the data in the multimedia memory 160. If the DMA engine 164 is included in the multimedia engine 112, the DMA engine may perform this operation, as desired, as shown in FIG. 11.

In one embodiment, the CPU 102 writes video or audio instructions or commands to the main memory 110 in conjunction with the corresponding video and/or audio data. In this embodiment, the CPU 102 writes only transfer information to the command buffers 166 on the separate command path. This transfer information includes pointers that point to the beginning address in main memory 110 where the data and commands reside and includes the length or number of bytes of the data, as well as other information. In step 410 the multimedia engine 112 uses the transfer information to retrieve the commands and data from main memory 110 into multimedia memory 160.

In an alternate embodiment, the CPU 102 also provides graphical and/or audio commands to the multimedia engine 112 in addition to the transfer data structure. These commands are used by the DSP engine 210 to process the video or audio data and to produce the appropriate signals at the video and audio ports 172 and 174.

In the embodiment shown in FIG. 3, the multimedia engine 112 includes a dedicated DMA (direct memory access) engine 164 which reads transfer information from the command buffers 166 or a designated address space in the multimedia memory 160 and retrieves the commands and data from the main memory 110 to the multimedia memory 160 using high speed burst transfers. In one embodiment, the multimedia memory 160 is separated into two or more address spaces or buffers, and the DMA engine 164 retrieves multimedia data into one address space or buffer while the DSP engine 210 accesses commands and data from the other address space or buffer. This ensures that the DSP engine 210 has uninterrupted access to commands and data in the multimedia memory 160 while also allowing the DMA engine 164 to simultaneously retrieve real-time commands and data to the multimedia memory 160.

Once real-time or multimedia data and commands have been placed in the multimedia memory 160, either by the CPU 102 or retrieved from main memory 110, in step 412 the one or more DSP engines 210 in the multimedia engine 112 read the commands and data from the multimedia memory 160 and in step 414 perform the necessary graphics and audio processing functions. The multimedia engine 112 then generates the appropriate video and audio signals to the video and audio ports 172 and 174 in step 416. In one embodiment, the multimedia memory 160 is partitioned into separate address spaces for commands and data, and the DSP engine 210 retrieves commands from a first address space and retrieves data from a second address space.

The CPU 102 preferably writes video and/or audio commands and data to the main memory 110 instead of directly to the multimedia memory 160 in order to minimize CPU accesses to the multimedia memory 160. This ensures that the DSP engine 210 has full access to the multimedia memory 160 for real-time processing. Further, the DSP engine 210 retrieves commands and data from the main memory 110 only when necessary, and the DSP engine 210 is not "locked out" of the multimedia memory 160 due to CPU writes to the multimedia memory 160.

In an alternate embodiment, the CPU 102 writes video and/or audio data and commands directly to the multimedia memory 160. In this embodiment, the CPU executes applications software and driver software from the main memory 110 and writes any associated video and audio data directly to the multimedia memory 160 in the multimedia engine 112. The driver software also writes high level commands directly to the multimedia memory 160 on the separate command path. Thus, the video drivers write high level commands to the multimedia memory 160 in a similar manner to current PCI-based graphics acceleration cards.

In one embodiment, as described above, the multimedia memory 160 is separated into two or more address spaces or buffers, and the CPU 102 writes to one address space or buffer while the DSP engine 210 accesses commands and data from the other address space or buffer. This ensures that the DSP engine 210 has uninterrupted access to commands and data in the multimedia memory 160 while also allowing the CPU 102 to directly write real-time commands and data to the multimedia memory 160.

Alternate embodiment—FIG. 11

FIG. 11 is a flowchart diagram illustrating operation of an alternate embodiment of the present invention, wherein the DMA engine 164 retrieves multimedia commands and data into the multimedia memory. The flowchart describes operations for the embodiments of FIGS. 1–8 where the DMA engine 164 is used to transfer data. Thus, the steps shown in FIG. 11 are used regardless of whether the DMA engine 164 is comprised in the multimedia engine 112 or the arbiter block 161, and also regardless of whether the multimedia memory 160 is comprised in the multimedia engine 112 or separate from the multimedia engine 112.

When an application executing on the CPU 102 generates multimedia data, the CPU 102 writes the multimedia data to the main memory 110 in step 502 using the data path or memory bus 108. The multimedia data includes data and may include one or more commands that perform operations on the data.

The CPU 102 then provides a data structure comprising one or more transfer commands to the DMA engine 164 in step 504. In one embodiment, the CPU 102 provides the data structure to the command buffers 166. In another embodiment, the CPU 102 provides the data structure to an address space in the multimedia memory 160 accessible by the DMA engine 164. The data structure comprises location information regarding the multimedia data, including the beginning address of the data, the length or number of bytes of the data, as well as other information. Alternatively, the CPU 102 provides the data structure to buffers within the DMA engine 164.

In step 506 the DMA engine 164 optionally prioritizes the data structure with other realtime data structures that have already been received. Thus the DMA engine 164 intelligently prioritizes received multimedia data structures based on a desired priority scheme and the available resources. In an alternate embodiment, the DMA engine 164 does not prioritize received data structures or commands, but rather merely acts as a slave and executes received data structures to transfer multimedia data in the order the data structures are received.

In step 508 the DMA engine 164 arbitrates for access to the main memory 110. This involves asserting a bus request signal to the arbitration logic 107 in the chipset 106. The DMA engine 164 may also provide priority data, preferably one or more priority bytes, to the arbitration logic 107 which is used by the arbitration logic 107 in determining the arbitration. Once the DMA engine 164 achieves access to main memory 110, the DMA engine 164 uses the data structure received from the CPU 102 to access the multimedia data from main memory 110 and store the data in the multimedia memory 160.

In this embodiment, the CPU 102 writes video or audio instructions or commands to the main memory 110 in conjunction with the corresponding video and/or audio data, and the CPU 102 writes only location information to the DMA engine 164 which references the location in main memory 110 where the data and commands reside. In step 510 the DMA engine 164 uses the location information to retrieve the commands and data from main memory 110 into multimedia memory 160. The DMA engine 164 preferably retrieves the data using high speed burst transfers.

In one embodiment, as described above, the multimedia memory 160 is separated into two or more address spaces or buffers, and the DMA engine 164 retrieves multimedia data into one address space or buffer while the DSP engine 210 accesses commands and data from the other address space or buffer. This ensures that the DSP engine 210 has uninterrupted access to commands and data in the multimedia memory 160 while also allowing the DMA engine 164 to simultaneously retrieve real-time commands and data to the multimedia memory 160.

The CPU 102 preferably writes video and/or audio commands and data to the main memory 110 instead of directly to the multimedia memory 160 in order to minimize CPU accesses to the multimedia memory 160. This ensures that the DSP engine 210 has full access to the multimedia memory 160 for real-time processing.

Once real-time or multimedia data and commands have been placed in the multimedia memory 160 by the DMA engine 164, in step 512 the one or more DSP engines 210 in the multimedia engine 112 read the commands and data from the multimedia memory 160 and in step 514 perform the necessary graphics and audio processing functions. The multimedia engine 112 then generates the appropriate video and audio signals to the video and audio ports 172 and 174 in step 516. In one embodiment, the multimedia memory 160 is partitioned into separate address spaces for commands and data, and the DSP engine 210 retrieves commands from a first address space and retrieves data from a second address space.

Conclusion

Therefore, the present invention comprises a novel computer system architecture which increases the performance of real-time applications. A dedicated multimedia engine and multimedia memory are coupled directly to the main memory. The computer system includes separate data and command paths to the multimedia engine and/or multimedia memory for transferring data and commands. This allows for more efficient transfers within the computer system.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer system, comprising:
   a bus for transferring data;
   a CPU coupled to the bus which initiates transfers on said bus;
   main memory coupled to said bus which stores data accessible by the CPU;
   a multimedia engine coupled to said bus, wherein said multimedia engine comprises:
   multimedia memory for storing multimedia data;
   one or more DSP engines coupled to said multimedia memory, wherein said one or more DSP engines process said multimedia data stored in said multimedia memory;
   one or more input/output channels coupled to said one or more DSP engines for transmitting data; and
   one or more ports coupled to said one or more input/output channels for transmitting data externally from said multimedia engine; and
   a command path coupled between said CPU and said multimedia engine, wherein said CPU and said multimedia engine are coupled to said command path, and wherein said command path is separate from said bus;
   wherein said CPU provides commands over said command path to said multimedia engine.

2. The computer system of claim 1, wherein said multimedia engine further comprises:
   a command buffer coupled to said command path for receiving and storing commands received from said CPU through said command path.

3. The computer system of claim 1, wherein said CPU writes transfer commands through said command path to said multimedia engine, wherein said multimedia engine further comprises:
   a direct memory access engine which receives said transfer commands from said CPU over said command path, wherein said direct memory access engine executes said transfer commands to transfer data from said main memory to said multimedia memory.

4. The computer system of claim 1, wherein said CPU writes transfer commands through said command path to said multimedia engine, wherein said multimedia engine further comprises:
   a command buffer coupled to said command path for receiving and storing said transfer commands received from said command path; and
   a direct memory access engine coupled to said command buffer, wherein said direct memory access engine receives said transfer commands from said command buffer and executes said transfer commands to transfer data from said main memory to said multimedia memory.

5. The computer system of claim 1, further comprising:
   arbitration logic coupled between said CPU and said bus;
   wherein said arbitration logic receives main memory access requests from each of said CPU and said multimedia engine and grants main memory access to either of said CPU or said multimedia engine.

6. The computer system of claim 5, wherein said arbitration logic receives multimedia memory access requests from each of said CPU and said multimedia engine and grants multimedia memory access to either of said CPU or said multimedia engine.

7. The computer system of claim 1, further comprising:
   chipset logic coupled between said CPU and said bus;
   a peripheral expansion bus coupled to said chipset logic;
   one or more peripheral devices coupled to said peripheral expansion bus;
   wherein said multimedia engine is coupled to said peripheral expansion bus, and wherein at least a portion of said command path comprises said peripheral expansion bus.

8. The computer system of claim 1, wherein said peripheral expansion bus is the Peripheral Component Interconnect bus.

9. A computer system comprising:
   a bus for transferring data
   a CPU coupled to the bus which initiates transfers on said bus;
   main memory coupled to said bus which stores data accessible by the CPU;
   a bus interface unit coupled to said bus;
   a peripheral expansion bus coupled to said bus interface unit;
   one or more peripheral devices coupled to said peripheral expansion bus;
   a multimedia engine coupled to said bus and also coupled to said peripheral expansion bus, wherein said multimedia engine comprises:
   multimedia memory for storing multimedia data;
   one or more DSP engines coupled to said multimedia memory, wherein said one or more DSP engines process said multimedia data stored in said multimedia memory;
   one or more input/output channels coupled to said one or more DSP engines for transmitting data; and
   one or more ports coupled to said one or more input/output channels for transmitting data externally from said multimedia engine;
   wherein said CPU provides commands through said bus interface unit and said peripheral expansion bus to said multimedia engine.

10. The computer system of claim 9, wherein said multimedia engine further comprises:
    a command buffer coupled to said peripheral expansion bus for receiving and storing commands received from said CPU through said command path.

11. The computer system of claim 10, wherein said multimedia engine further comprises:
    a direct memory access engine coupled to said command buffer which receives said transfer commands from said command buffer, wherein said direct memory access engine executes said transfer commands to transfer data from said main memory to said multimedia memory.

12. A computer system, comprising:
a bus for transferring data;
a CPU coupled to the bus which initiates transfers on said bus;
main memory coupled to said bus which stores data accessible by the CPU;
multimedia memory coupled to said bus for storing multimedia data;
a direct memory access engine coupled between said bus and said multimedia memory;
a command path coupled between said CPU and said direct memory access engine, wherein said CPU and said direct memory access engine are coupled to said command path, and wherein said command path is separate from said bus;
wherein said CPU provides commands over said command path to said direct memory access engine, wherein said direct memory access engine receives said transfer commands from said CPU over said command path, wherein said direct memory access engine executes said transfer commands to transfer data from said main memory to said multimedia memory;
a multimedia engine coupled to said bus, wherein said multimedia engine comprises:
one or more DSP engines coupled to said multimedia memory, wherein said one or more DSP engines process said multimedia data stored in said multimedia memory;
one or more input/output channels coupled to said one or more DSP engines for transmitting data;
one or more ports coupled to said one or more input/output channels for transmitting data externally from said multimedia engine.

13. The computer system of claim 12, wherein said direct memory access engine further comprises:
a command buffer coupled to said command path for receiving and storing commands received from said CPU through said command path.

14. The computer system of claim 12, further comprising:
arbitration logic coupled between said multimedia memory and said bus, wherein said direct memory access engine is coupled to said arbitration logic, wherein said arbitration logic receives multimedia memory access requests from each of said direct memory access engine and said multimedia engine and grants multimedia memory access to either of said direct memory access engine or said multimedia engine.

15. The computer system of claim 12, further comprising:
arbitration logic coupled between said CPU and said bus;
wherein said arbitration logic receives main memory access requests from each of said CPU and said direct memory access engine and grants main memory access to either of said CPU or said direct memory access engine.

16. The computer system of claim 12, further comprising:
chipset logic coupled between said CPU and said bus;
a peripheral expansion bus coupled to said chipset logic;
one or more peripheral devices coupled to said peripheral expansion bus;
wherein said multimedia engine is coupled to said peripheral expansion bus, and wherein at least a portion of said command path comprises said peripheral expansion bus.

17. The computer system of claim 16, wherein said peripheral expansion bus is the Peripheral Component Interconnect bus.

18. A computer system, comprising:
a bus for transferring data;
a CPU coupled to the bus which initiates transfers on said bus;
main memory coupled to said bus which stores data accessible by the CPU;
multimedia memory coupled to said bus for storing multimedia data;
a bus interface unit coupled to said bus;
a peripheral expansion bus coupled to said bus interface unit;
one or more peripheral devices coupled to said peripheral expansion bus;
a direct memory access engine coupled between said bus and said multimedia memory, wherein said direct memory access engine is also coupled to said peripheral expansion bus;
wherein said CPU provides transfer commands through said bus interface unit and said peripheral expansion bus to said direct memory access engine, wherein said direct memory access engine receives said transfer commands from said CPU, and wherein said direct memory access engine executes said transfer commands to transfer data from said main memory to said multimedia memory;
a multimedia engine coupled to said bus, wherein said multimedia engine comprises:
one or more DSP engines coupled to said multimedia memory, wherein said one or more DSP engines process said multimedia data stored in said multimedia memory;
one or more input/output channels coupled to said one or more DSP engines for transmitting data; and
one or more ports coupled to said one or more input/output channels for transmitting data externally from said multimedia engine.

19. The computer system of claim 18, wherein said direct memory access engine further comprises:
a command buffer coupled to said command path for receiving and storing commands received from said command path.

20. A computer system, comprising:
a bus for transferring data
a CPU coupled to the bus which initiates transfers on said bus;
main memory coupled to said bus which stores data accessible by the CPU;
multimedia memory coupled to said bus for storing multimedia data;
a direct memory access engine coupled between said bus and said multimedia memory;
a multimedia engine coupled to said bus, wherein said multimedia engine comprises:
one or more DSP engines coupled to said multimedia memory, wherein said one or more DSP engines process said multimedia data stored in said multimedia memory;
one or more input/output channels coupled to said one or more DSP engines for transmitting data; and
one or more ports coupled to said one or more input/output channels for transmitting data externally from said multimedia engine; and a command path coupled between said CPU and said multimedia engine, wherein said CPU and said multimedia engine are coupled to said command path, and wherein said command path is separate from said bus;

wherein said CPU provides commands over said command path to said multimedia engine, wherein said multimedia engine receives said transfer commands from said CPU over said command path, wherein said multimedia engine executes said transfer commands to transfer data from said main memory to said multimedia memory.

21. The computer system of claim 20, wherein said multimedia engine further comprises:

a command buffer coupled to said command path for receiving and storing commands received from said command path.

22. The computer system of claim 20, wherein said CPU writes transfer commands through said command path to said multimedia engine, wherein said multimedia engine further comprises:

a direct memory access engine which receives said transfer commands from said CPU over said command path, wherein said direct memory access engine executes said transfer commands to transfer data from said main memory to said multimedia memory.

23. The computer system of claim 20, wherein said CPU writes transfer commands through said command path to said multimedia engine, wherein said multimedia engine further comprises:

a command buffer coupled to said command path for receiving and storing said transfer commands received from said command path; and a direct memory access engine coupled to said command buffer, wherein said direct memory access engine receives said transfer commands from said command buffer and executes said transfer commands to transfer data from said main memory to said multimedia memory.

24. The computer system of claim 20, further comprising:

arbitration logic coupled between said CPU and said bus;

wherein said arbitration logic receives main memory access requests from each of said CPU and said multimedia engine and grants main memory access to either of said CPU or said multimedia engine.

25. A computer system, comprising:

a bus for transferring data a CPU coupled to the bus which initiates transfers on said bus;

main memory coupled to said bus which stores data accessible by the CPU;

multimedia memory coupled to said bus for storing multimedia data;

a direct memory access engine coupled between said bus and said multimedia memory;

a bus interface unit coupled to said bus;

a peripheral expansion bus coupled to said bus interface unit;

one or more peripheral devices coupled to said peripheral expansion bus;

a multimedia engine coupled to said bus and also coupled to said peripheral expansion bus, wherein said multimedia engine comprises:

one or more DSP engines coupled to said multimedia memory, wherein said one or more DSP engines process said multimedia data stored in said multimedia memory;

one or more input/output channels coupled to said one or more DSP engines for transmitting data; and one or more ports coupled to said one or more input/output channels for transmitting data externally from said multimedia engine;

wherein said CPU provides transfer commands through said bus interface unit and said peripheral expansion bus to said multimedia engine, wherein said multimedia engine receives said transfer commands, and wherein said multimedia engine executes said transfer commands to transfer data from said main memory to said multimedia memory.

26. The computer system of claim 25, wherein said multimedia engine further comprises:

a command buffer coupled to said peripheral expansion bus for receiving and storing commands received from said CPU.

27. The computer system of claim 25, wherein said multimedia engine further comprises:

a direct memory access engine which receives said transfer commands from said CPU over said peripheral expansion bus, wherein said direct memory access engine executes said transfer commands to transfer data from said main memory to said multimedia memory.

28. A method for performing multimedia operations in a computer system, wherein the computer comprises a bus, a CPU coupled to the bus, main memory coupled to the bus which stores data accessible by the CPU, a multimedia engine coupled to the bus, a multimedia memory coupled to the bus, wherein the multimedia memory stores multimedia data, and a command path coupled between the CPU and the multimedia engine, the method comprising:

the CPU transferring multimedia data to the main memory over the bus;

the CPU transferring a transfer data structure to the multimedia engine over the command path, wherein the command path is separate from the bus, wherein said transfer data structure includes multimedia data location information indicating a location in the main memory where said multimedia data was stored in said step of transferring;

the multimedia engine transferring the multimedia data from the main memory to the multimedia memory, wherein the multimedia engine uses said multimedia data location information in said transfer data structure to access said multimedia data in the main memory;

the multimedia engine accessing said multimedia data from the multimedia memory;

the multimedia engine performing operations using said multimedia data after said step of accessing said multimedia data from the multimedia memory; and the multimedia engine generating video and/or audio outputs in response to said step of performing operations using said multimedia data.

29. The method of claim 28, wherein said multimedia engine includes a direct memory access engine;

wherein said step of the CPU transferring said transfer data structure to the multimedia engine comprises the CPU transferring said transfer data structure over the command path to the direct memory access engine in the multimedia engine;

wherein said step of the multimedia engine transferring the multimedia data from the main memory to the multimedia memory comprises the direct memory access engine transferring the multimedia data from the main memory to the multimedia memory.

30. A method for performing multimedia operations in a computer system, wherein the computer comprises a bus, a CPU coupled to the bus, main memory coupled to the bus which stores data accessible by the CPU, a bus interface unit coupled to the bus, a peripheral expansion bus coupled to the bus interface unit, a multimedia engine coupled to the bus and coupled to the peripheral expansion bus, and a multimedia memory coupled to the bus, wherein the multimedia memory stores multimedia data, the method comprising:

the CPU transferring multimedia data to the main memory over the bus;

the CPU transferring a transfer data structure to the multimedia engine over the peripheral expansion bus, wherein said transfer data structure includes multimedia data location information indicating a location in the main memory where said multimedia data was stored in said step of transferring;

the multimedia engine transferring the multimedia data from the main memory to the multimedia memory, wherein the multimedia engine uses said multimedia data location information in said transfer data structure to access said multimedia data in the main memory;

the multimedia engine accessing said multimedia data from the multimedia memory;

the multimedia engine performing operations using said multimedia data after said step of accessing said multimedia data from the multimedia memory; and the multimedia engine generating video and/or audio outputs in response to said step of performing operations using said multimedia data.

31. The method of claim 30, further comprising:

the CPU arbitrating for control of the peripheral expansion bus prior to said step of the CPU transferring said transfer data structure to the multimedia engine over the peripheral expansion bus.

32. A method for performing multimedia operations in a computer system, wherein the computer comprises a bus, a CPU coupled to the bus, main memory coupled to the bus which stores data accessible by the CPU, a multimedia engine coupled to the bus, a multimedia memory coupled to the bus, wherein the multimedia memory stores multimedia data, a direct memory access engine coupled between the multimedia memory and the bus, and a command path coupled between the CPU and the direct memory access engine, the method comprising:

the CPU transferring multimedia data to the main memory over said bus;

the CPU transferring a transfer data structure to the direct memory access transfer engine over said command path, wherein the command path is separate from the bus, wherein said transfer data structure includes multimedia data location information indicating a location in the main memory where said multimedia data was stored in said step of transferring;

the direct memory access transfer engine transferring the multimedia data from the main memory to the multimedia memory, wherein the direct memory access transfer engine uses said multimedia data location information in said transfer data structure to access said multimedia data in the main memory;

the multimedia engine accessing said multimedia data from the multimedia memory;

the multimedia engine performing operations using said multimedia data after said step of accessing said multimedia data from the multimedia memory; and the multimedia engine generating video and/or audio outputs in response to said step of performing operations using said multimedia data.

33. A method for performing multimedia operations in a computer system, wherein the computer comprises a bus, a CPU coupled to the bus, main memory coupled to the bus which stores data accessible by the CPU, a multimedia engine coupled to the bus, a multimedia memory coupled to the bus, wherein the multimedia memory stores multimedia data, a bus interface unit coupled to the bus, a peripheral expansion bus coupled to the bus interface unit, a direct memory access engine coupled between the multimedia memory and the bus, wherein the direct memory access engine is also coupled to the peripheral expansion bus, the method comprising:

the CPU transferring multimedia data to the main memory over said bus;

the CPU transferring a transfer data structure to the direct memory access engine over said peripheral component interconnect bus, wherein said transfer data structure includes multimedia data location information indicating a location in the main memory where said multimedia data was stored in said step of transferring;

the direct memory access transfer engine transferring the multimedia data from the main memory to the multimedia memory, wherein the direct memory access transfer engine uses said multimedia data location information in said transfer data structure to access said multimedia data in the main memory;

the multimedia engine accessing said multimedia data from the multimedia memory;

the multimedia engine performing operations using said multimedia data after said step of accessing said multimedia data from the multimedia memory; and the multimedia engine generating video and/or audio outputs in response to said step of performing operations using said multimedia data.

34. The method of claim 33, further comprising:

the CPU arbitrating for control of the peripheral expansion bus prior to said step of the CPU transferring said transfer data structure to the multimedia engine over the peripheral expansion bus.

* * * * *